Feb. 20, 1940.  J. W. CLARKE  2,191,009
PEDAL ACTUATED WINDSHIELD SHADE
Filed Nov. 16, 1938  2 Sheets-Sheet 1
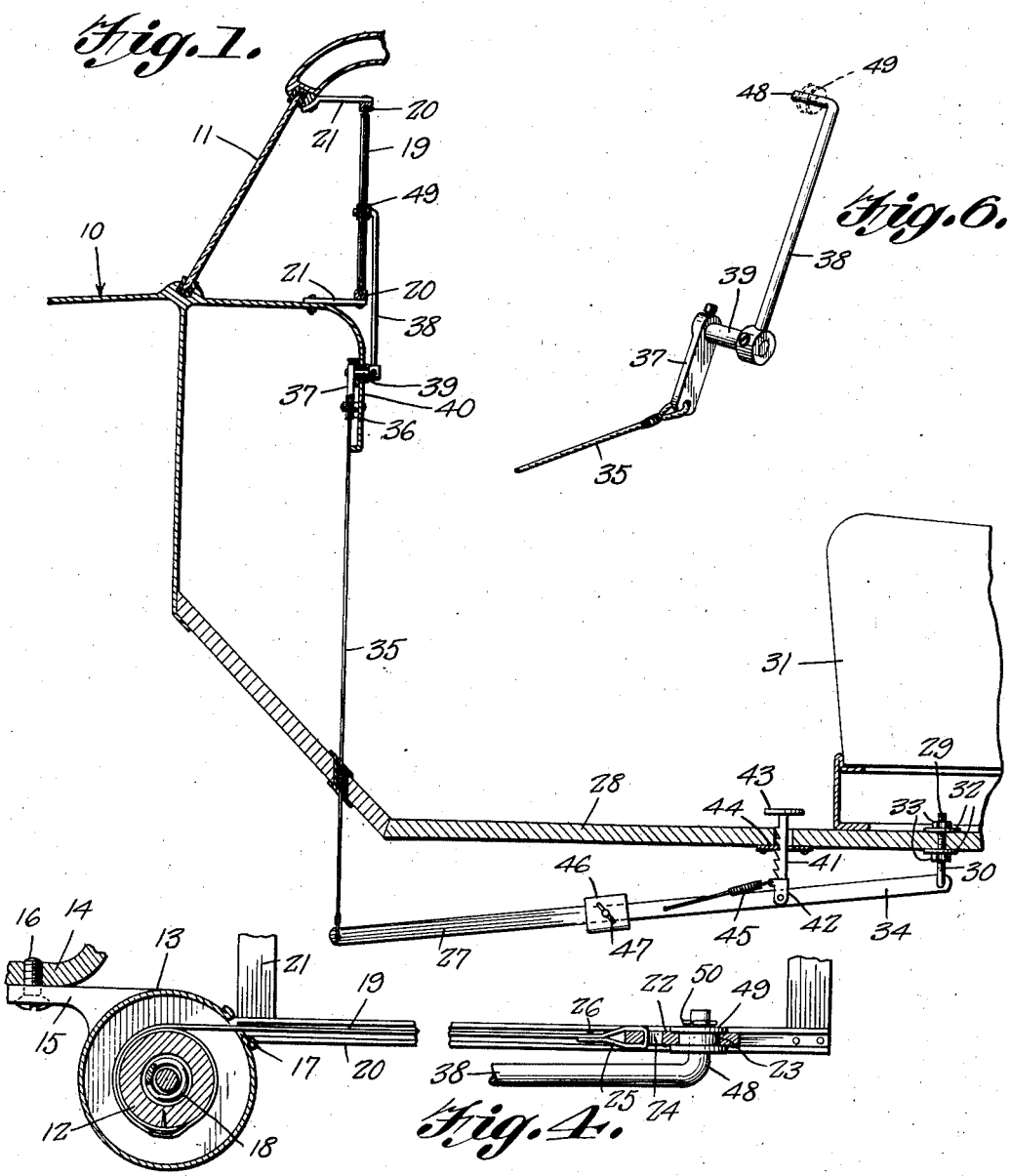
John W. Clarke, INVENTOR
BY Victor J. Evans & Co.
ATTORNEYS Feb. 20, 1940.  J. W. CLARKE  2,191,009
PEDAL ACTUATED WINDSHIELD SHADE
Filed Nov. 16, 1938  2 Sheets-Sheet 2
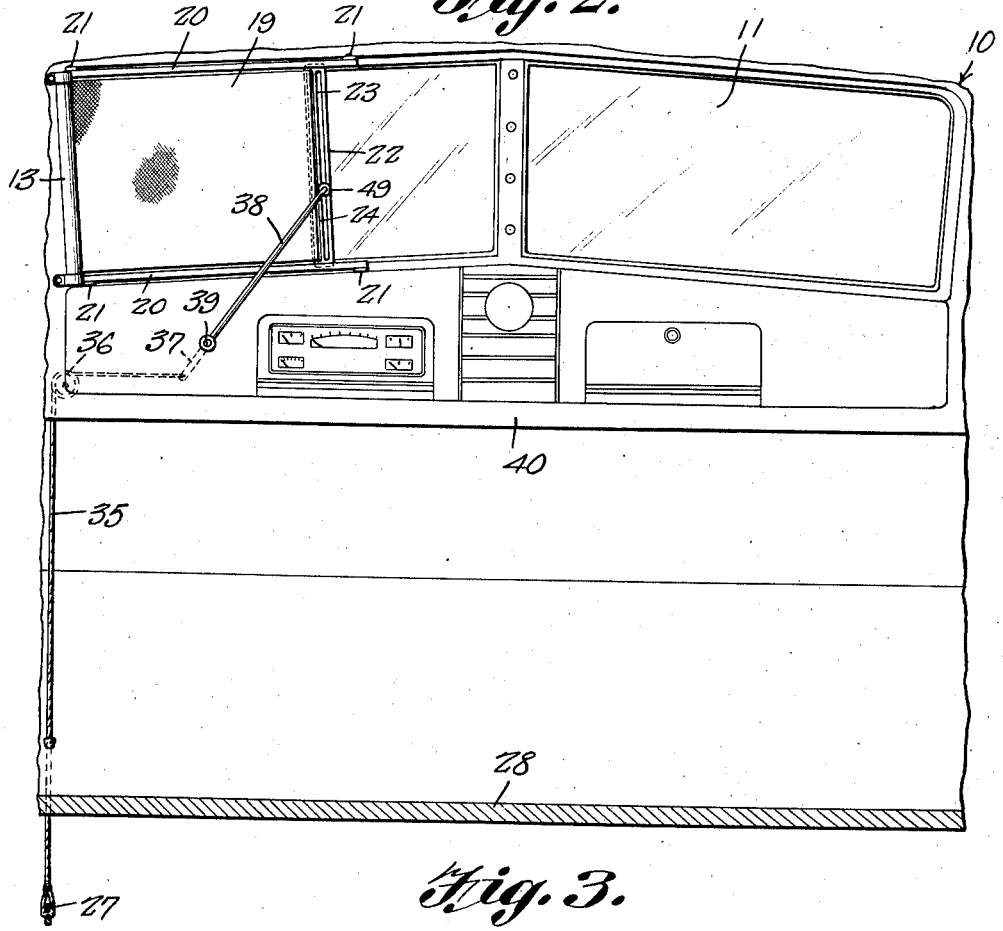
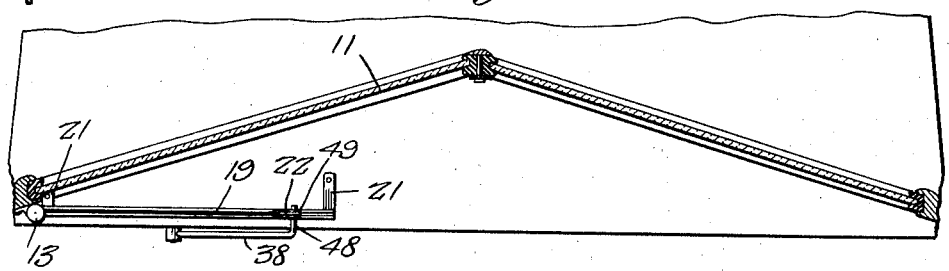
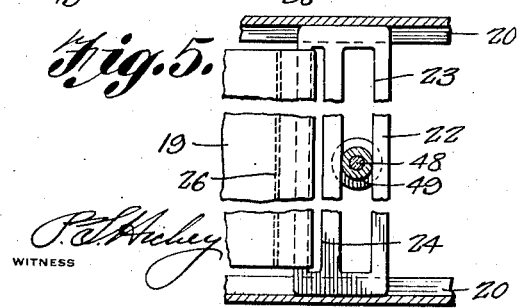
John W. Clarke, INVENTOR
BY Victor J. Evans & Co. ATTORNEYS Patented Feb. 20, 1940

2,191,009

UNITED STATES PATENT OFFICE 2,191,009

PEDAL ACTUATED WINDSHIELD SHADE

John W. Clarke, Russellville, Ky.

Application November 16, 1938, Serial No. 240,847

5 Claims. (Cl. 296—97)

The present invention relates to devices for use in automobiles and the like for dimming the glare of headlights of oncoming vehicles.

The principal object of the invention is to provide an efficient and mechanically simple device adapted to be attached to the windshield of a vehicle in such a manner that it may be moved into position to shield the eyes of the driver of the vehicle from the headlights of oncoming vehicles.

A further object of the invention is to provide a glare shield including the use of a shade or dimming element which is rotatably mounted on a roller attached by means of a bracket to the windshield of the vehicle and in conjunction therewith a foot actuated lever mechanism operated by the driver of the vehicle for actuating the roller to shield the eyes of the driver of the vehicle from the headlights of oncoming vehicles.

The invention will be fully and comprehensively understood from a consideration of the following detailed description when read in connection with the accompanying drawings which form a part of the application.

In the drawings:

Figure 1 is a longitudinal sectional view through a portion of a vehicle and illustrating the new and improved dimming device in position.

Figure 2 is a rear elevational view of the device illustrated in Figure 1 with parts thereof in section.

Figure 3 is a transverse sectional view through the windshield of the vehicle and looking downwardly on the device.

Figure 4 is a sectional view through a portion of the windshield and illustrating the dimmer shield in extended position.

Figure 5 is a fragmentary sectional view illustrating the free end of the dimmer shield.

Figure 6 is a fragmentary perspective view of the dimmer shield actuating mechanism.

Referring to the drawings for a more detailed description thereof wherein there is illustrated the preferred embodiment of the invention, the vehicle to which the device is attached is indicated generally by the reference numeral 10, said vehicle being provided with the conventional windshield 11. The windshield herein disclosed is the V-shaped type, but it is to be understood, however, that the device is adaptable for use with other types of windshields without departing from the spirit of the invention.

The dimming element hereinafter termed a shade 19 is mounted on a roller 12 supported within a casing 13, which casing is attached to the frame 14 of the windshield by means of the bracket 15 and fastening element 16. A slot 17 extends longitudinally of the casing 13 through which the free end of the shade is guided. The shade roller 12 is provided with a conventional spring 18 for returning the shade 19 to normal position thereon upon the release of pressure on the free end thereof.

For guiding the shade 19 in its movement across the windshield, there is provided a trackway 20 attached to the upper and lower edges of the windshield 11 by means of suitable brackets 21. Mounted for slidable movement in the trackway 20 is a bar 22 which is slotted substantially the entire length thereof as indicated at 23 for a purpose to be hereinafter described, and as clearly illustrated in Figure 5 of the drawings a second vertical slot 24 is also provided through which the free end 25 of the shade 19 is threaded and held therein by the means indicated at 26 such as stitching or the like. Movement of the bar 22 within the trackway 20 causes the shade 19 to be wound and unwound on its roller 12 to position the shade across the windshield when desired by the driver to shield his eyes from the headlights of oncoming vehicles.

The mechanism for actuating the bar 22 includes a lever 27 which is pivotally attached beneath the floor board 28 of the vehicle by the connection indicated generally by the numeral 29. The connection 29 comprises a U-shaped bolt 30 extending through the floor board 28 and preferably beneath the front seat 31 of the vehicle, and is fixedly held in position by means of a pair of clamping straps 32 and lock nuts 33. The end 34 of the lever 27 is pivotally connected to the U-shaped bolt and the opposite end has attached thereto a cable 35 which extends upwardly through the floor board of the vehicle and is trained over a pulley 36, which is preferably mounted in back of the dash board 40, as illustrated in Figure 2 of the drawings. The end of the cable passing over the pulley 36 is attached to the short end 37 of the lever 38, and the long end of the lever 38 is mounted within the slot 23 of the bar 22. Referring to Figure 6 of the drawings it will be noted that the portions 37 and 38 are connected by means of the short transverse member 39 which extends through the dash board 40. By means of this construction the short end 37 to which the cable is attached is concealed behind the dash board 40 and the only visible member is the rod 38 which extends upwardly from the member 39. The members 37 and 38 are attached to the end of the member 39 and by any desired means may be so attached as to be readily detachable therefrom.

Suitable means is provided for actuating the lever 27 to swing the shade across the windshield through the medium of the rod 38 and bar 22, which includes a ratchet bar 41 extending through the floor board 28 and attached to the lever 27 by means of the integrally formed yoked end 42. The opposite end of the ratchet bar 41 is provided with an enlarged head portion 43 forming a pedal and adapted to be engaged by the foot of the driver of the vehicle when desiring to depress the lever 27. A plate 44 is attached to the underneath portion of the floor board 28 and is adapted to be engaged by the ratchet teeth of the bar 41 to retain the shade at a desired position thereby obviating the necessity of constantly maintaining pressure on the pedal 43. By means of the yoke 42 and its pivotal attachment with the lever 27, the bar 41 is adapted to rock in a forward and backward motion. The pedal is held in forward position by means of the spring 45 having one end attached to the yoke 42 and the opposite end attached to the lever 27. In order to release the ratchet from the plate 44, it will be necessary to push the bar 41 backwardly and then a slight downward motion will move the shade across the windshield the desired distance. Releasing pressure on the pedal causes the spring 45 to urge the bar 41 forwardly into engagement with the plate 44, thus permitting the driver to remove his foot from the pedal without allowing the shade to re-roll. This is readily understood from an inspection of Figure 1 of the drawings.

Means in the form of a weight 46 is adjustably mounted on the lever 27 between the pedal 43 and the end to which the cable is attached for counteracting the strength of the return spring 18 of the roller 12. The weight 46 is slidable on the lever 27 and is adjustably held thereon by means of the clamp screw 47.

As afore-mentioned the free end of the shade 19 is attached to a vertically disposed bar 22, which bar is slidable in the trackway 29. The upper end of the rod 38, which is actuated to move the shade, is connected to the bar 22 and is slidably disposed within the slot 23. The upper end of the rod 38 has a curved end 48 having mounted thereon a roller 49 held by means of a cotter-pin or the like 50. The roller 49 is slightly smaller in diameter than the slot 23 whereby it is free to move upwardly or downwardly therein during the winding or unwinding of the shade 19. In other words, as the rod 38 swings about the axis of the member 39 to move the shade forwardly and backwardly across the windshield, the roller 49 moves within the slot 23 thereby providing the necessary contact with the bar 22, to which the free end of the shade is attached, to move it in the desired direction.

From the above description, it is believed that the operation of the device is readily apparent. The driver of the vehicle meeting an oncoming vehicle can, after pressing the conventional beam switch to dip the headlights as required by law in most states, move his left foot backwardly a few inches and with the heel thereof press down on the pedal 43. This will lower the forward end of the bar 27 thereby urging the cable 35 downwardly around the pulley 36 and at the same time pulling the lower end 37 of the rod 38 toward the left. The upper end of the rod 38 which is pivotally attached to the transverse member 39 will move to the right and, through the medium of the roller 49 and bar 22, draw the shade as far as desired. As the oncoming vehicle is approached the driver can gradually release pressure on the pedal 43, allowing the spring in the shade roller 12 to return the shade within the casing.

It is to be understood that the casing containing the shade roller and the shade will be positioned on the side of the windshield and out of direct line with the view of the driver so as not to obstruct the driver's view of the road when the shade is in its rolled position. It is also to be understood that the shade employed with the device may be formed of any light diffusing material and may be attached to the roller by any desired means.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. In combination with an automotive vehicle including a windshield, a spring operated roller structure supported by the windshield, a shade extensively mounted on said roller and adapted to be moved across the windshield, a vertically mounted bar slidably disposed in a trackway carried by the frame of the windshield, means for attaching one end of the shade to said bar, means for actuating said bar to move the shade across the windshield, said means including a lever having one end pivotally mounted beneath the vehicle, a flexible cable attached to the free end of said lever, means attached to the other end of said cable and pivotally supported beneath said shade for actuating said bar when depressing said lever, and means within said vehicle for depressing said lever.

2. In combination with an automotive vehicle including a windshield, shade means carried by the vehicle and adapted to be moved across the windshield, a bar having vertical slots therein slidably mounted in a trackway carried by the windshield frame, means for attaching one end of the shade to said bar, means for actuating said bar to move the shade across the windshield, said means including a lever having one end pivotally mounted beneath the floor board of the vehicle, a flexible cable attached to the free end of said lever, means attached to the other end of said cable and having engagement with one of the slots of said bar for actuating said bar when depressing said lever for moving the shade across the windshield, and means within said vehicle for depressing said lever.

3. A dimmer shade for attachment to the windshield of a vehicle comprising a bracket adapted to be attached to one side of said windshield, a cylindrical casing carried by said bracket, a shade carried on a roller mounted in said casing, one end thereof movable through a slot provided in said casing, a bar having vertical slots therein slidably mounted in a trackway carried by the windshield frame, means for attaching one end of the shade to said bar, means for actuating said bar to move the shade across the windshield, said means including a lever having one end pivotally mounted beneath the floor board of the vehicle, a flexible cable attached to the free end of said lever and extending over a pulley mounted within the vehicle, means attached to the other end of said cable for actuating said slotted bar when depressing said lever, means within said vehicle for depressing said lever, said means including a pedal extending through the floor board and having one end thereof pivotally attached to said lever, and ratchet means carried by said pedal for retaining the same in fixed position when depressing said lever.

4. A dimmer shade for attachment to the windshield of a vehicle comprising a bracket adapted to be attached to one side of said windshield, a cylindrical casing carried by said bracket, a shade carried on a roller mounted in said casing, one end thereof movable through a slot provided in said casing, a bar having vertical slots therein slidably mounted in a trackway carried by the windshield frame, means for attaching one end of the shade to said bar, means for actuating said bar to move the shade across the windshield, said means including a lever having one end pivotally mounted beneath the floor board of the vehicle, a flexible cable attached to the free end of said lever and extending over a pulley mounted within the vehicle, the other end of said cable being fixed to the short end of a vertically disposed rod, a second rod connected to said first rod by means of a transverse bar, means for attaching said second rod to said slotted bar and means for depressing said lever whereby said first and second rods are moved to actuate said slotted bar.

5. A dimmer shade for attachment to the windshield of a vehicle comprising a bracket adapted to be attached to one side of said windshield, a cylindrical casing carried by said bracket, a shade carried on a roller mounted in said casing, one end thereof movable through a slot provided in said casing, a bar having vertical slots therein slidably mounted in a trackway carried by the windshield frame, means for attaching one end of the shade to said bar, means for actuating said bar to move the shade across the windshield, said means including a lever having one end pivotally mounted beneath the floor board of the vehicle, a flexible cable attached to the free end of said lever and extending over a pulley mounted within the vehicle, the other end of said cable being fixed to the short end of a vertically disposed rod, a second rod connected to said first rod by means of a transverse bar, said second rod having a roller mounted on the free end thereof and positioned within one of the slots of said bar whereby movement of said rod about the transverse bar actuates said slotted bar within the trackway to move said shade across the windshield.

JOHN W. CLARKE.